May 14, 1968  F. D. MANZOLILLO  3,382,737
ENGINE AND TRANSMISSION CONTROL
Filed April 4, 1966  5 Sheets-Sheet 1

INVENTOR
Francis Donald Manzolillo
ATTORNEY

May 14, 1968  F. D. MANZOLILLO  3,382,737
ENGINE AND TRANSMISSION CONTROL
Filed April 4, 1966  5 Sheets-Sheet 2

INVENTOR
Francis Donald Manzolillo
BY
ATTORNEY

May 14, 1968        F. D. MANZOLILLO        3,382,737

ENGINE AND TRANSMISSION CONTROL

Filed April 4, 1966        5 Sheets-Sheet 4

INVENTOR
Francis Donald Manzolillo

ATTORNEY

May 14, 1968      F. D. MANZOLILLO      3,382,737

ENGINE AND TRANSMISSION CONTROL

Filed April 4, 1966      5 Sheets-Sheet 5

INVENTOR
Francis Donald Manzolillo
BY
ATTORNEY

United States Patent Office 3,382,737
Patented May 14, 1968

3,382,737
ENGINE AND TRANSMISSION CONTROL
Francis D. Manzolillo, P.O. Box 324,
Peoria, Ill. 61601
Filed Apr. 4, 1966, Ser. No. 540,071
12 Claims. (Cl. 74—878)

ABSTRACT OF THE DISCLOSURE

An engine and transmission control mechanism comprises a clutch control member and an engine control member having facing surfaces one being grooved and the other having three spaced bores. An interlock member comprises a rod slideable in a tube between the two facing members and abutting a ball. When the ball is located in the groove, the other end of the rod is clear of the bores in the other member which is thus freely movable. When the ball rises out of the groove, the rod enters one or other of the bores and locks the bored member against further movement.

---

The invention relates to control mechanisms for use with engine and transmission systems for controlling the engine speed and the setting of the transmission. The invention relates in particular to such control mechanisms for use with marine engine and transmission systems.

It is an object of the invention to provide an improved control mechanism for use with engine and transmission systems.

It is a further object of the invention to provide a substantially fool-proof control mechanism for use with engine and transmission systems which prevents such misuse by an operator as would cause damage to the engine or transmission.

It is another object of the invention to provide a control mechanism having two control levers, one for adjustment of engine speed and the other for adjustment of the transmission setting, and which includes interlock means to prevent operation of the levers in a manner such as would cause damage to the engine or transmission.

According to the invention, there is provided a control unit for an engine and transmission system, comprising
A body,
A speed control lever pivotable on said body,
A speed-control member connected to the speed control lever,
A transmission control lever pivotable on said body,
A transmission control member connected to the transmission control lever,
Means respectively connecting the engine and the transmission with the speed control member and the transmission control member,
And interlock means acting between the two said members to prevent movement of each said member unless the other said member is in a predetermined position.

A throttle and clutch control embodying the invention for a marine vessel engine and transmission system will now be described by way of example and referring to the accompanying drawings in which.

Figure 1:
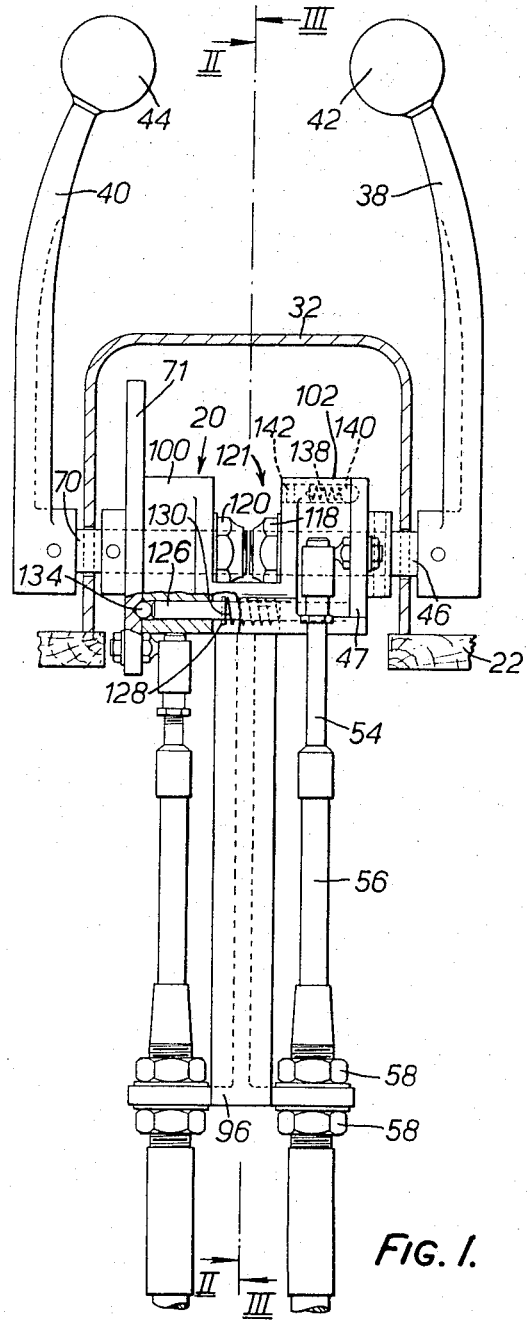
FIGURE 1 is a side elevation of the control unit with part of its cover cut away to show the internal mechanism.

The control unit comprises a main casting 20, which will be described in detail below with reference to FIGURES 4 to 7, which is positioned over an opening in the body or wall 22 of the vessel and is secured in position by means of screws and nuts 24 to 30 (see FIGURES 2 and 3). The control unit has a protective cover 32 which is secured in position by means of screws 34 (see FIGURES 2 and 3) which engage suitably positioned holes 36 (see FIGURES 4 to 7) in the casting 20.

Figure 2:
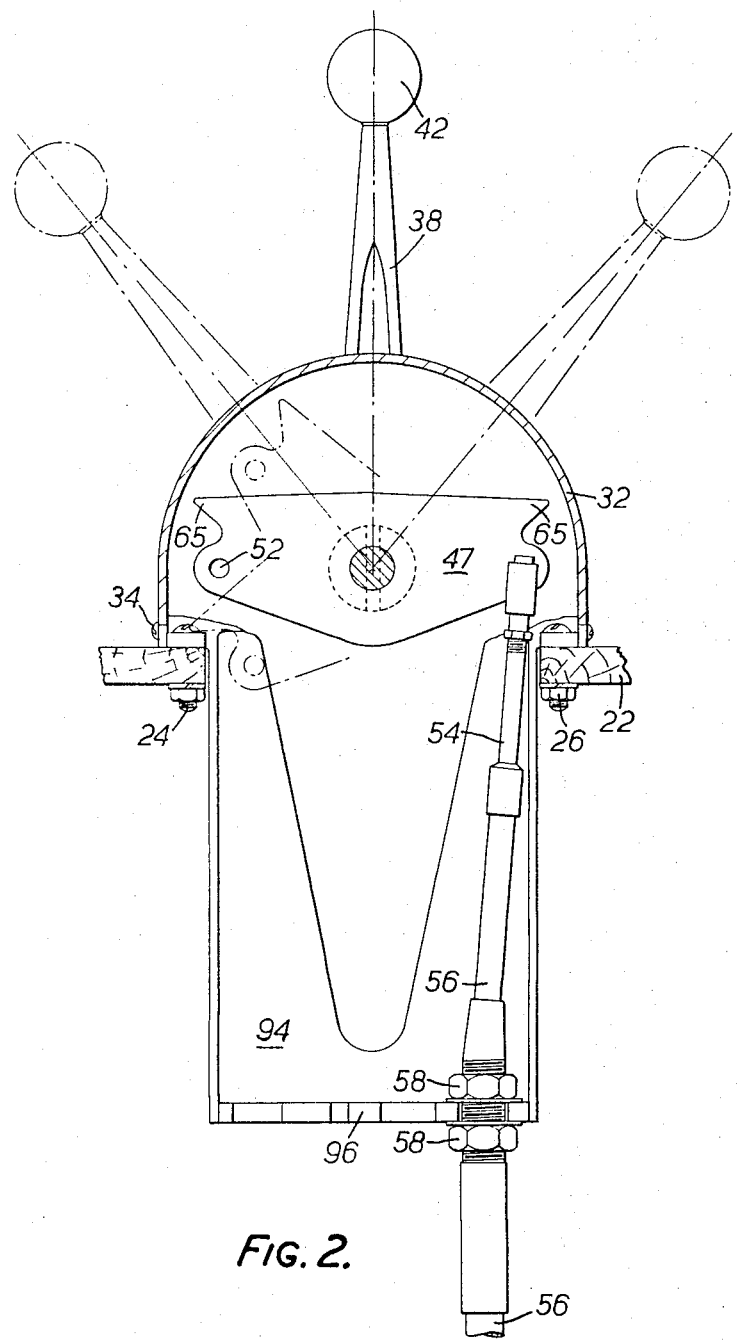
FIGURE 2 is a diagrammatic sectional elevation on the line II—II of FIGURE 1 with some of the interior mechanism omitted.
Figure 3:
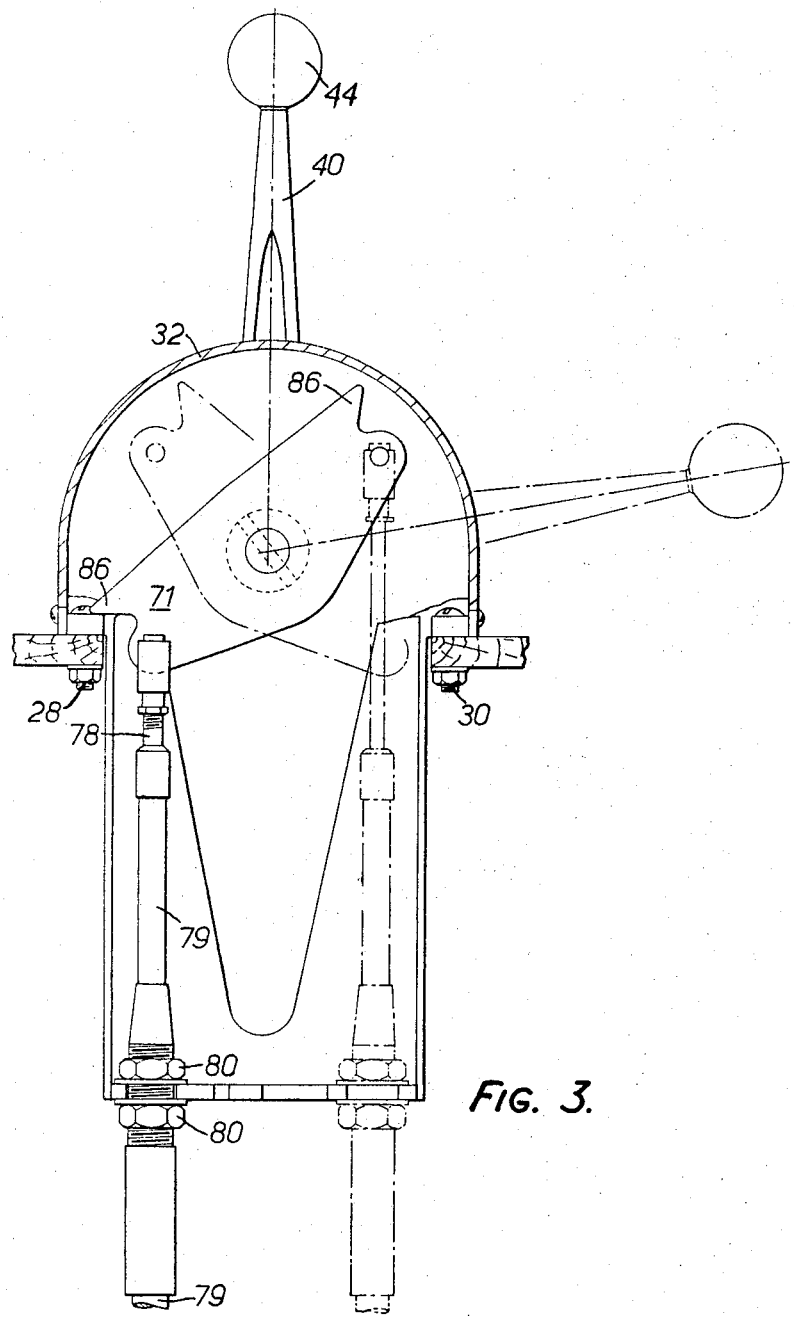
FIGURE 3 is a diagrammatic sectional elevation on the line III—III of FIGURE 1 with some of the interior mechanism omitted.
Figure 4:
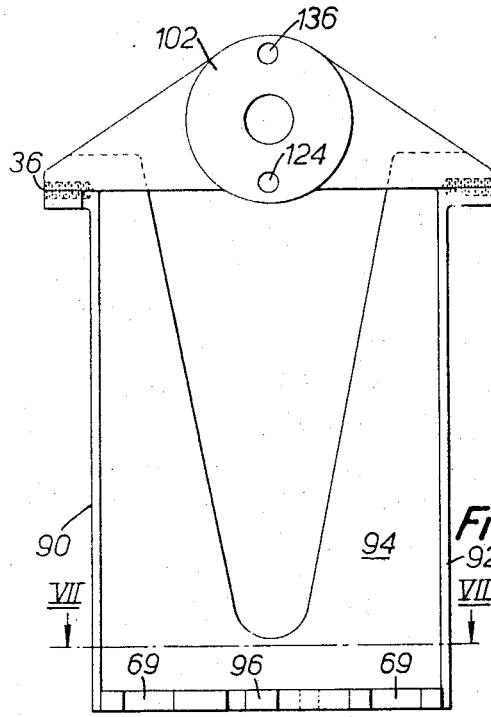
FIGURE 4 is a side elevation of the main casting of the control unit.
Figure 8:
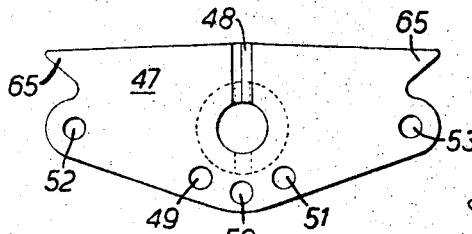
FIGURE 8 is a side elevation of a clutch-operating cam in the control unit.
Figure 9:
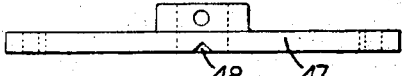
FIGURE 9 is a plan view of the cam of FIGURE 8.
Figure 13:
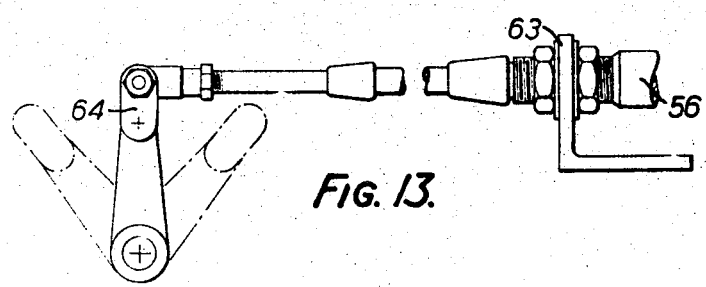
FIGURE 13 is a diagrammatic view of the connection of the clutch operating cable to the transmission.

In FIGURES 1 to 3, part of the cover 32 is cut away to reveal the internal mechanism. The control unit has a pair of levers, a clutch lever 38 and a throttle lever 40, which are respectively provided with different coloured knobs 42 and 44. The clutch lever 38 is pinned to a shaft 46 which is rotatably supported in the casting 20 and freely passes through a hole in the cover 32. The shaft 46 is pinned to a clutch-operating cam 47 (FIGURES 2, 8 and 9). The cam 47 is formed with a groove 48 (FIGURES 8 and 9), and holes 49 to 51, the purpose of which will be explained. It also has a pair of further holes 52 and 53, and to one of these, the hole 53, is attached a clutch operating cable 54 (FIGURES 1 and 2). The cable 54 runs in an outer casing 56 which is located by nuts 58 in a slot 60 ( see FIGURES 4 to 7) at the end of a downwardly extending leg 62 on the main casting 20. The outer casing 56 leads the cable 54 to the marine transmission or gear box. At its remote end, the casing 56 is attached by means of nuts to a bracket 63 (FIGURE 13) on the body of the transmission and the cable 54 is connected to an operating rod 64 which controls the setting of the transmission.

In operation, the cable 54 moves in its outer casing 56 in response to movement of the lever 38 and the cam 47, and causes corresponding movement of the operating rod 64. The arrangement is such that, when the lever 38 is in its central position, as shown in the full line in FIGURE 2, the cam 47 maintains the cable 54 in such a position relative to the casing 56 that the transmission is held in the NEUTRAL setting by the rod 64. Movement anticlockwise, as viewed in FIGURE 2, of the lever 38 rotates the cam 47 anti-clockwise and pulls the cable 54 through the casing 56 for such a distance as causes the rod 64 to shift the transmission into the FORWARD setting. When the lever 38 is moved clockwise from its central position, the cam 47 is likewise rotated clockwise and causes the rod 64 to shift the transmission into the REVERSE setting. The clutch-operating cam 47 is provided with ears 65 which respectively engage portions 66 (see FIGURE 6) of the casting 20 at the extreme positions of the lever 38, which are shown dotted in FIGURE 2. This engagement of the ears 65 with the casting 20 prevents undue wear on the cable 54 and the transmission operating mechanism which might arise arise due to over-travel of the lever 38, and positively limits the movement of the lever 38 to forty angular degrees on each side of its central position, giving a total possible travel of 80°. It will be appreciated that the lay-out of any particular installation determines which position of the lever 38 corresponds to the FORWARD setting of the transmission and which position corresponds to the REVERSE setting; the particular arrangement described, in which the FORWARD setting corresponds to the extreme anti-clockwise position of the lever 38, as viewed in FIGURE 2, and the REVERSE setting corresponds the extreme clockwise position of the lever 38, is purely exemplary in this respect. In any particular installation, the relationship between the position of the lever 38 and the corresponding setting of the transmission can be reversed by connecting the end of the cable 54 in the hole 52 in the cam 47, instead of in the hole 53, and re-positioning the casing 56 in a slot 67 (see FIGURES 4 to 7) in the casting 20.

Figure 10:
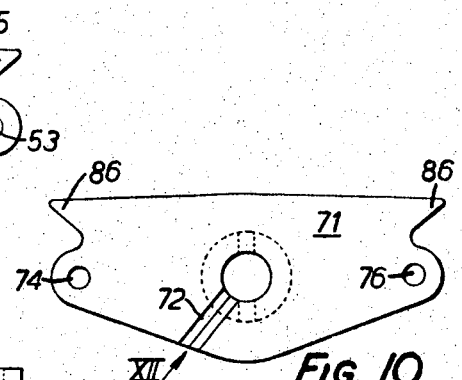
FIGURE 10 is a side elevation of a throttle-operating cam in the control unit.
Figure 11:
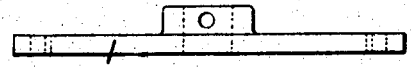
FIGURE 11 is a plan view of the cam shown in FIGURE 10.
Figure 12:
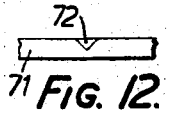
FIGURE 12 is a scrap underside view looking in the direction of the arrow XII of FIGURE 10.
Figure 14:
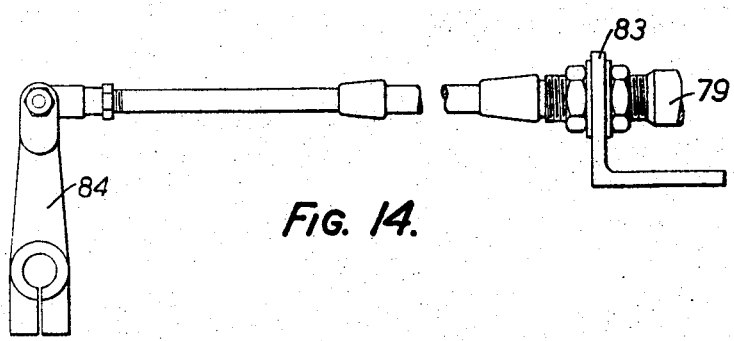
FIGURE 14 is a diagrammatic view of the connection of the throttle operating cable to the engine.

The throttle lever 40 is pinned to a shaft 70 which is rotatably supported in the casting 20 and passes freely through a hole in the cover 32. The shaft 70 is itself pinned to a throttle-operating cam 71, shown in detail in FIGURES 10 to 12, which is provided with a groove 72 and two holes 74 and 76. A cable 78 (FIGURE 3) is connected in the hole 74 and runs in a casing 79, one end of which is located by nuts 80 in a slot 82 (FIGURE 6) in the casting 20. The casing 79 leads the cable 78 to the engine. At its remote end the casting 79 is attached by means of nuts to a bracket 83 (FIGURE 14) on the engine, and the cable 78 is connected to the engine throttle operating rod 84 which controls the setting of the engine throttle.

In operation, the cable 78 moves in its outer casing 79 in responset o movement of the lever 40 and the cam 71 and causes corresponding movement of the throttle operating rod 84. The arrangement is such that, when the lever 40 is in the upright position shown in the full line in FIGURE 3, the cam 71 so positions the cable 78 in the casing 79 that the engine throttle is held in the IDLE setting by the rod 84. When the lever 40 is moved in a clockwise direction, as viewed in FIGURE 3, towards the dotted position, the cam 71 pulls the cable 78 through the casing 79 and opens the engine throttle; when the lever 40 has reached the dotted position, which corresponds to a clockwise movement of 80 angular degrees from the upright position, the engine throttle is in the FULL SPEED setting. The cam 71 is provided with two ears 86 which respectively engage the portions 66 (FIGURE 6) of the casting 20 in the two extreme positions of the lever 40; as in the case of the ears 65 on the clutch-operating cam 47 (FIGURE 2), the ears 86 positively limit the travel of the cam 71 (to 80 angular degrees) and prevent strain on the engine throttle due to over-travel of the cable 78. If required in any particular installation, the cable 78 can be attached in the hole 76 in the cam 71 instead of in the hole 74, the casing 79 being relocated in a slot 88 (see FIGURE 6) in the casting 20; if this is done, then it will be appreciated that the dotted position of the lever 40 in FIGURE 3 corresponds to the IDLE setting of the engine throttle while the upright position of the lever 40 corresponds to the FULL SPEED setting of the engine throttle.

The main casting 20 and the interlock arrangement of the control unit will now be described in greater detail with particular reference to FIGURES 1 and 4 to 7. The leg portion 62 of the casting comprises a pair of side pieces 90 and 92 which are interconnected by a slotted web 94 and which support a foot portion 96 in which are positioned the slots 60, 67, 82 and 88 for receiving the cable casings 56 and 79 (FIGURES 1, 2 and 3) as already mentioned. The leg 62 supports a top portion comprising limbs 97 and 98, and two bosses 100 and 102. The limbs 97 and 98 define through holes 104, 106, 108 and 110 for respectively receiving the fixing screws 24 to 30 (FIGURES 2 and 3). The limbs 97 and 98 also support the surfaces 66 which are engaged by the ears 65 and 86 on the cams 47 and 71 respectively, and define the tapped holes 36 for receiving the screws 34 (FIGURES 2 and 3) which hold the cover 32 in place.

Figure 5:
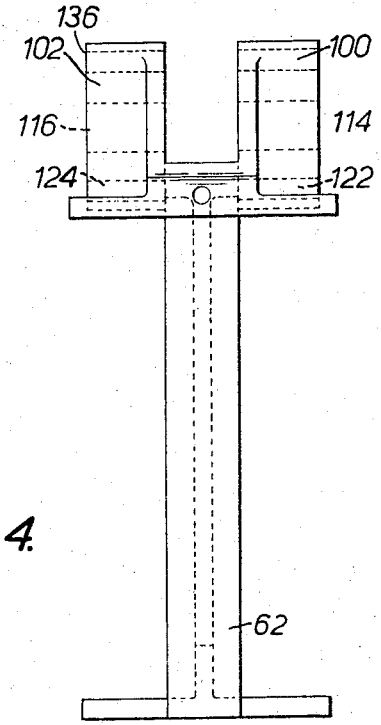
FIGURE 5 is an end elevation of the casing of FIGURE 4.
Figure 6:
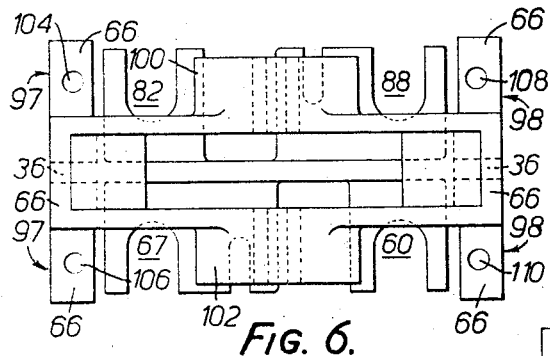
FIGURE 6 is a plan view of the casting shown in FIGURES 4 and 5.
Figure 7:
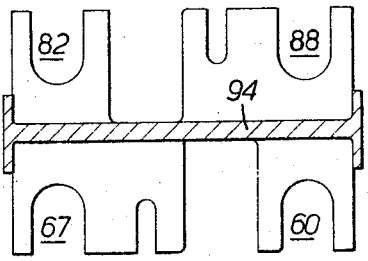
FIGURE 7 is a section on the lines VII—VII of FIGURE 4.

The bosses 100 and 102 respectively define aligned through bores 114 and 116. As shown most clearly in FIGURE 1, the bore 114 receives the shaft 46 carrying the clutch-operating cam 47 while the bore 116 receives the shaft 70 carrying the throttle-operating cam 71. The shafts 46 and 70 are rotatably secured in position by the means of nuts 118 and 120 which are located in a space 121 between the two bosses 100 and 102. The bosses 100 and 102 are respectively provided with further aligned through bores 122 and 124 (FIGURE 5). An interlock shaft 126 (FIGURE 1) is a loose fit in the bores 122 and 124 and extends across the space 121. The shaft 126 has a U piece 128 frictionally clamped to it, and a compression spring 130 is located on the shaft so as to act between the boss 102 and the U piece 128, thus urging the shaft 126 to the left as viewed in FIGURE 1. The shaft 126 has a diameter slightly smaller than that of the holes 49 to 51 in the clutch-operating cam 47 (FIGURE 8). The left hand end of the shaft 126 carries a detent ball 134 which is thus pressed against the throttle-operating cam 71 by the spring 130 and which locates in the groove 72 in the cam 71 when the cam is suitably aligned.

The boss 102 of the casting 20 has a further through bore 136 which receives a compression spring 138 (FIGURE 1) and a further detent ball 140. The bore 136 is tapped to receive a screw 142 against which the spring 138 acts so that the ball 140 is urged into contact with the clutch-operating cam 47, the ball 140 entering the groove 48 in the cam 47 when the cam is suitably positioned.

The operation of the interlock arrangement will now be described, it being assumed initially that both levers 38 and 40 are in the positions illustrated in full line in FIGURES 1, 2 and 3. The clutch-operating cam 47 is therefore so positioned that its groove 48 is vertical and is engaged by detent ball 140, thus providing resistance to movement of the lever and indicating to the operator that the marine gear-box is in the NEUTRAL setting. The strength of the detent resistance can be adjusted by adjusting screw 142. The throttle-operating cam 71 is in the position shown in FIGURE 3 so that its groove 72 is also vertical and is engaged by the detent ball 134 which is pressed into the groove by the compression spring 130. The detent ball 134 therefore provides a resistance to movement of the lever 38 which indicates to the operator that the engine throttle is in the IDLE setting and which has to be overcome by the operator in order to open the engine throttle. The strength of the detent resistance can be adjusted by adjusting the position of the U-clamp 128 on the shaft 126. When the two levers 38 and 40 are in their upright positions as described, so that the detent ball 134 is pressed into the groove 72 in the throttle-operating cam 71 by the spring 130, the shaft 126 is positioned sufficiently far to the left (as shown in FIGURE 1) as to be clear of the clutch-operating cam 47. Therefore, the operator may freely move the clutch lever 40 in either direction, so as to place the marine transmission in the FORWARD or the REVERSE setting as desired, once he has overcome the detent resistance provided by the ball 140.

If, however, with the clutch lever 40 in its central position, the throttle lever 38 is moved away from its upright position, the corresponding movement of the throttle-operating cam 71 will cause the detent ball 134 to ride up the edge of the groove 72 thus forcing the interlock shaft 126 to the right, as viewed in FIGURE 1. Therefore, the right hand end of the shaft will enter the aligned hole 50 in the clutch-operating cam 47. Hence, once the throttle lever 38 has been moved from its upright position, so that the engine throttle is no longer in the IDLE setting, the clutch lever 40 cannot be moved from its central position because of the presence of the interlock shaft 126 in the hole 50. The transmission is therefore maintained in the NEUTRAL setting.

When the throttle lever 38 is in its upright position, so that the groove 72 in the throttle-operating cam 71 is engaged by the detent ball 134, the clutch lever 40 is freely moveable, as explained, because the right hand end of the shaft 126 is clear of the clutch-operating cam 47. As soon as the clutch lever 40 has been moved away from its central position, movement of the throttle lever is positively prevented until the clutch lever has reached one or other of its extreme positions, thus shifting the transmission into its FORWARD or REVERSE setting as the case may be. Any attempt to move the throttle lever 38 when the clutch lever 40 is in an intermediate position (so that the transmission is not positively in its NEUTRAL, FORWARD or REVERSE setting) is positively prevented by the fact that the shaft 126 cannot move to the right since its right hand end will abut against the face of the clutch-operating cam 47; since the shaft cannot move to the right, the ball 134 cannot ride out of the groove 72 in the throttle-operating cam 71, and the cam is therefore locked against movement. When the clutch lever 40 has reached one or other of its extreme positions, so that the marine transmission is positively in its FORWARD or REVERSE setting, then one or other of the holes 49 and 51 (FIGURE 8) in the clutch-operating cam 47 will be in line with the right end of the shaft 126. Movement of the throttle lever 38 from its upright position is now possible when required since the shaft 126 can now move to the right and enter the aligned hole 49 or 51 thus allowing the detent ball 134 to ride out of the groove 72. Once any such movement of the throttle lever 38 has taken place, so that the shaft 126 has entered the aligned hole 49 or 51, then, of course, no further movement of the clutch lever 40 is possible; that is, the transmission cannot be disengaged from the FORWARD or REVERSE setting, as the case may be, until the throttle lever 38 has been returned to its upright position.

Therefore, the interlock arrangement of the control unit described permits the engine speed to be varied by the operator only when the transmission is positively in one of its three settings, that is, NEUTRAL, FORWARD and REVERSE. Damage to the engine transmission which might occur if the engine was allowed to run above idling speed when the transmission is not positively in the NEUTRAL, FORWARD or REVERSE setting is thus prevented. In addition, the interlock arrangement prevents the setting of the transmission from being altered unless the engine throttle control is in the IDLE setting. This again prevents damage to the engine or transmission, and furthermore, increases the effectiveness of an emergency FORWARD-to-REVERSE gear shift by ensuring that the engine speed is returned to idling during such a shift: cavitation which might occur should the vessel propellor be too rapidly accelerated in the REVERSE direction is thus reduced or eliminated. The control unit is therefore essentially fool-proof and very suitable for use by inexperienced operators. The necessity of bringing the engine speed down to IDLE before the transmission setting can be altered provides a time delay, within which the transmission can be properly shifted into its new setting, before the engine is again accelerated.

If the vessel has two engines, each with its associated transmission, then two of the control units described may be used. Preferably, the control units are mounted adjacent to each other. The boss 100 (see FIGURES 4 to 7) of the main casting 20 may advantageously be provided with a bore similar to the bore 136 in the boss 102. If this is done, then the throttle and clutch levers 38 and 40 of one of the two adjacent control units may, together with their associated components, be interchanged so as to permit the two throttle levers of the adjacent units to be positioned next to each other thus allowing simultaneous movement by the same hand of the operator. If the throttle and clutch levers and associated components are interchanged, then the shaft 126 with the ball 134 would, of course, be arranged in a manner opposite to that shown in FIGURE 1.

The control unit described can be used as part of a multi-point installation, that is, where more than one control unit is used for controlling the same engine and transmission system. A multi-point installation may be a "parallel" or "tandem" installation. In a "parallel" installation, each of the control units is connected independently to the engine throttle and transmission so that the throttle and clutch levers on each control unit are operable independently. In a "tandem" installation, the throttle-operating and clutch-operating cams of one control unit are connected to control the throttle and clutch levers respectively of the other control unit whose operating cams are themselves connected to control the engine and transmission.

In all cases, an independent throttle control may be provided on the engine itself so as to enable the engine speed to be varied for warming up and testing purposes without the necessity of having to operate the control unit. In such a case, the throttle directly positioned on the engine would be linked to the throttle lever or throttle-operating cam of the control unit so as to prevent alteration of the transmission setting until the engine is returned to idling speed.

As described, the total movement permitted for the clutch and throttle levers 38 and 40 is limited to precisely 80 angular degrees. In order that this movement should be translated into the correct amount of movement of the engine throttle and the transmission selectors (or control valve in the case of a hydraulically operated transmission), the lengths of the operating rods 64 and 84 (FIGURES 13 and 14) are critical and dependent on the requisite angular movements of the shafts which they control. A nomograph may be provided to indicate the correct lengths of the operating rods in any particular installation.

While there has been described what is at present considered to be a preferred embodiment of the invention, it will be obvious to those skilled in the art that various changes and modifications may be made within the scope of the appended claims without departing from the scope and spirit of the invention.

What is claimed is:
1. A control unit
for an engine and transmission system comprising a body,
a speed control lever pivotable on said body,
a speed control member connected to the speed control lever,
a transmission control lever pivotable on said body,
a transmission control member connected to the transmission control lever,
the two said members being mounted to have facing surfaces and each facing surface defining at least one recess,
means respectively connecting the engine and the transmission with the speed control member and the transmission control member, and
interlock means acting between the two said members to prevent movement of each said member unless the other said member is in a predetermined position, the said interlock means including means mounted on the said body for movement between the two said members and arranged to permit movement of each said member only when it has entered the said recess defined by the other member.

2. A control unit according to claim 1, in which the said interlock means comprises
an elongated device mounted in the said body with two opposite ends respectively adjacent to the two said facing surfaces of the said members, the elongated device being constrained for limited longitudinal movement between the two said facing surfaces of the said members, and spring biasing means biasing the said elongated device longitudinally towards one said member.

3. A control unit according to claim 2, in which the said recess defined by the said facing surface in the said one member is a groove for engaging one said end of the elongated device when the said one member is in a said predetermined position whereby the other said end of the elongated device is clear of the said facing surface of the said other cam and permits movement of the said other member, the said one end of the elongated device riding up out of the said groove when the said one member is moved with the other member in a said predetermined position whereby the said other end of the elongated device enters a said recess in the said other member to permit movement of the said one member.

4. A control unit according to claim 3, in which at least one said recess defined in the said facing surface of the said other member is a bore.

5. A control unit according to claim 3, in which the said other member defines a plurality of spaced recesses each for receiving the said other end of the elongated device when the said other member is in a different said predetermined position.

6. A control unit according to claim 3, in which the elongated device comprises a rod and a ball, the ball being attached at an end of the rod.

7. A control unit according to claim 6, including means for adjusting the said spring biasing means.

8. a control unit according to claim 3, including adjustable detent means mounted on the said body for engaging the said other member when the said other member is in a said predetermined position for resisting movement of the member.

9. A control unit according to claim 3, in which each said member comprises a substantially flat plate pivoted to the said body for rotational movement relative thereto in response to movement of the respective one of the said levers, and in which the connecting means for connecting the said members to the engine and transmission respectively comprise mechanical cable connections, each said member having at least one means for attachment of the said cable connection at a point on the member spaced from its pivotal connection to the body.

10. A control unit for an engine and transmission system, comprising a body, a speed control lever pivotable on said body, a speed control cam connected to the speed control lever for movement therewith, a transmission control lever pivotable on said body, a transmission control cam connected to the transmission control lever for movement therewith, each said cam having a surface which faces a surface on the other said cam, at least one connection means on the speed control cam, a first cable casing attached to the said body and to the said engine, a first cable slideably mounted in the said first casing and connected between the said connection means on the speed control cam and the said engine for adjusting the engine speed in response to pivotal movement of the speed control lever, at least one connection means on the said transmission control cam, a second cable casing attached to the said body and to the said transmission, a second cable slideably mounted in the second cable casing and connected between the said connection means on the transmission control cam and the transmission for adjusting the setting of the transmission in response to pivotal movement of the transmission control lever, the said surface of one cam defining a groove having sloping sides and the said surface of the other cam defining at least one recess, a rod mounted in the said body so as to be slideable between the two said surfaces of the cams in a direction perpendicular to the said surfaces, a ball mounted at one end of the said rod so as to be adjacent to the said surface defining the groove, spring biasing means acting between the said body and the said rod for urging the rod and the said ball towards the said surface defining the groove, the rod having a cross section permitting it to enter a said recess defined by the surface of the said other cam, and the length of the rod and the diameter of the ball being together slightly greater than the perpendicular distance between the two said surfaces, whereby the said one cam is held against movement by engagement of the ball in the groove, when the rod abuts against the surface of the said other cam, and the said other cam is held against movement when the rod is forced into a said recess in its said surface, against the action of the spring biasing means, by engagement between the said ball and a said sloping side of the said groove in response to movement of the said one cam.

11. A control unit according to claim 10, in which each said cam has two projections and in which the said body has portions respectively positioned to be engaged by the said projections for precisely limiting the range of permitted movement of the said cams.

12. A control unit according to claim 10, in which the said cams are interchangeable on the said body.

References Cited

UNITED STATES PATENTS

| | | | |
|---|---|---|---|
| 2,351,485 | 6/1944 | Conkle | 74—483 |
| 2,438,691 | 3/1948 | Armantrout | 74—477 |
| 2,716,474 | 8/1955 | Panish | 74—483 |
| 2,771,168 | 11/1956 | Panish | 192—.096 |
| 2,966,970 | 1/1961 | Morse | 74—483 |

DONLEY J. STOCKING, *Primary Examiner.*

ROBERT A. O'LEARY, *Examiner.*

H. S. LAYTON, *Assistant Examiner.*